(12) United States Patent
Minelli

(10) Patent No.: US 9,433,150 B2
(45) Date of Patent: Sep. 6, 2016

(54) APPARATUS FOR PICKING OLIVES AND THE LIKE

(75) Inventor: Ermanno Minelli, Correggio (IT)

(73) Assignee: MINELLI ELETTROMECCANICA, Correggio, (RE) (IT)

( * ) Notice: Subject to any disclaimer, the term of this patent is extended or adjusted under 35 U.S.C. 154(b) by 419 days.

(21) Appl. No.: 14/110,965

(22) PCT Filed: Mar. 30, 2012

(86) PCT No.: PCT/EP2012/055836
§ 371 (c)(1),
(2), (4) Date: Oct. 10, 2013

(87) PCT Pub. No.: WO2012/143225
PCT Pub. Date: Oct. 26, 2012

(65) Prior Publication Data
US 2014/0026532 A1  Jan. 30, 2014

(30) Foreign Application Priority Data

Apr. 18, 2011  (IT) ............................. BO2011A0207

(51) Int. Cl.
*A01D 46/26*  (2006.01)
*A01D 46/253*  (2006.01)

(52) U.S. Cl.
CPC .......... *A01D 46/264* (2013.01); *A01D 46/253* (2013.01); *A01D 2046/266* (2013.01)

(58) Field of Classification Search
CPC .. A01D 46/24; A01D 46/253; A01D 46/264; A01D 2046/266

USPC ...... 56/12.4, 12.5, 35, 328.1, 330, 332, 333, 56/340.1, 400.07
See application file for complete search history.

(56) References Cited

U.S. PATENT DOCUMENTS 3,813,860 A * 6/1974 Cecchi ................ A01D 46/253
56/328.1

(Continued)

FOREIGN PATENT DOCUMENTS

EP  1 116 432 A1  7/2001
EP   1621063 A2   2/2006

(Continued)

*Primary Examiner* — John G Weiss
(74) *Attorney, Agent, or Firm* — McGlew and Tuttle, P.C.

(57) ABSTRACT

The apparatus for picking olives and the like comprises a support rod (2) suitable to be grasped; a shaker unit (3) comprising a containment box (7) suitable to be mounted at the top of the support rod (2); at least one comb sector (6, 60) shaping a support structure (9, 99) for a plurality of teeth (10), carried mobile by the containment box (7); a motor member for actuating the comb sector (6, 60) in a substantially swinging motion. The support structure (9, 99) is constrained rotatably in a sleeve (12, 120, 121) hinged to the containment box (7) at a transverse axis (13), so as to produce a first swinging motion of the support structure (9, 99) about the transverse axis (13). The support structure (9, 99) of the teeth (10) is further constrained to the containment box (7) at a portion distal to the sleeve (12, 120, 121) by means of an articulated joint (18), in such a way as to produce a second swinging motion of the support structure (9, 99) about its longitudinal axis.

10 Claims, 14 Drawing Sheets

(56) References Cited

U.S. PATENT DOCUMENTS

| | | | | |
|---|---|---|---|---|
| 4,222,219 A | * | 9/1980 | Lasswell | A01D 46/24 56/328.1 |
| 5,437,146 A | * | 8/1995 | Erickson | A01D 46/247 56/330 |
| 5,916,115 A | * | 6/1999 | Pavone | A01D 46/24 56/328.1 |
| 6,425,233 B1 | * | 7/2002 | Hosking | A01D 46/264 56/11.9 |

FOREIGN PATENT DOCUMENTS

| | | |
|---|---|---|
| EP | 1795064 A1 | 6/2007 |
| WO | 2008/000860 A1 | 1/2008 |

* cited by examiner

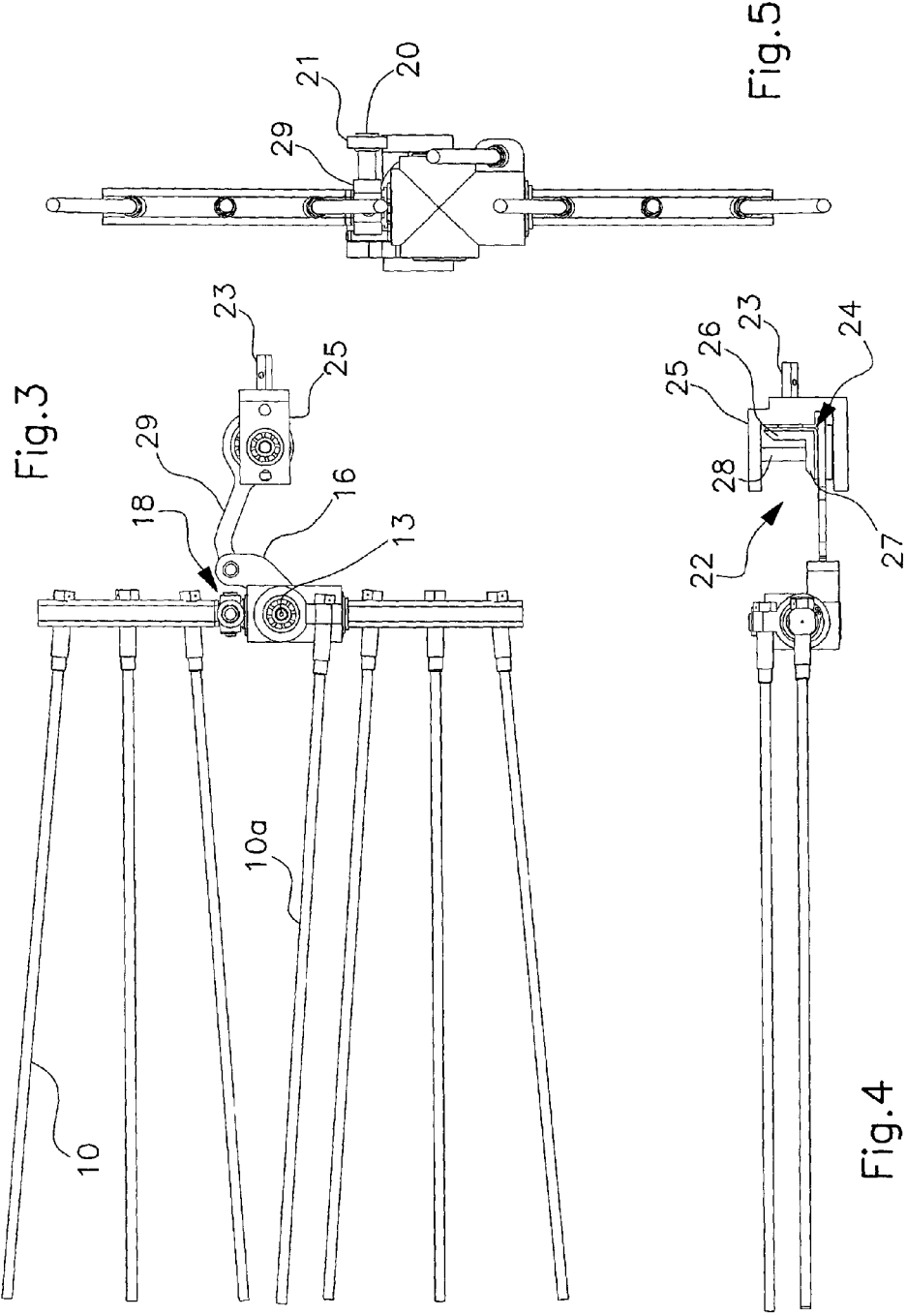

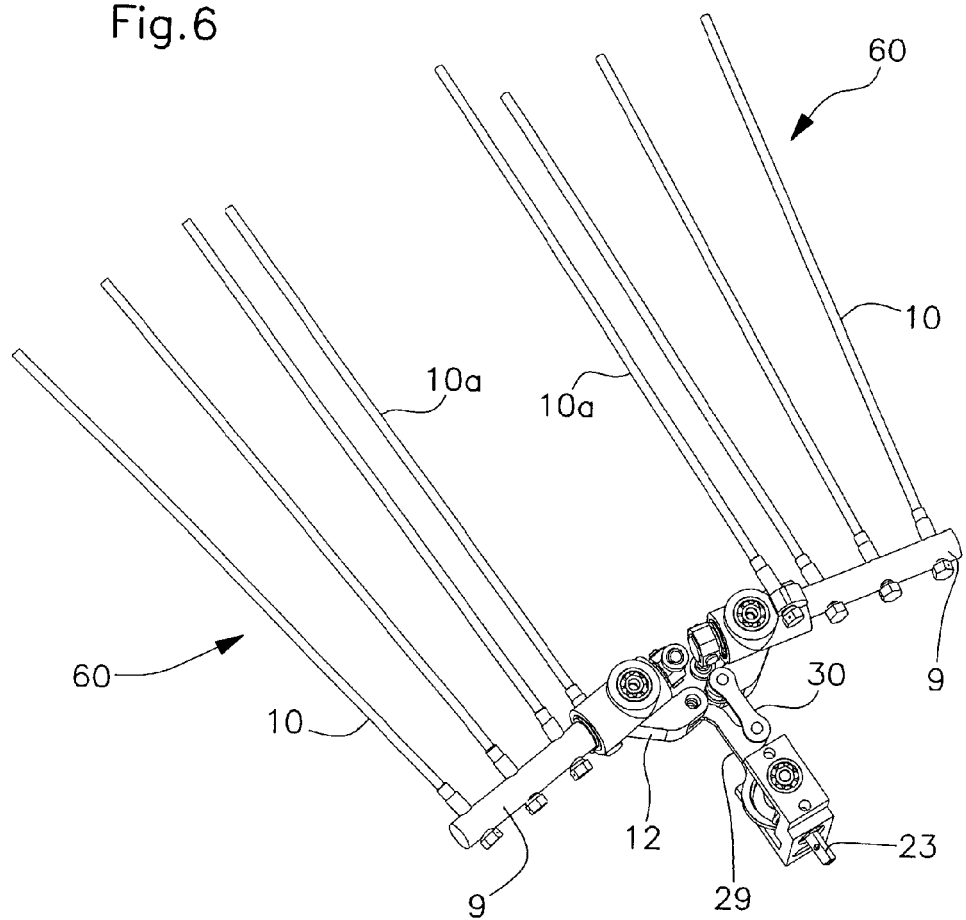

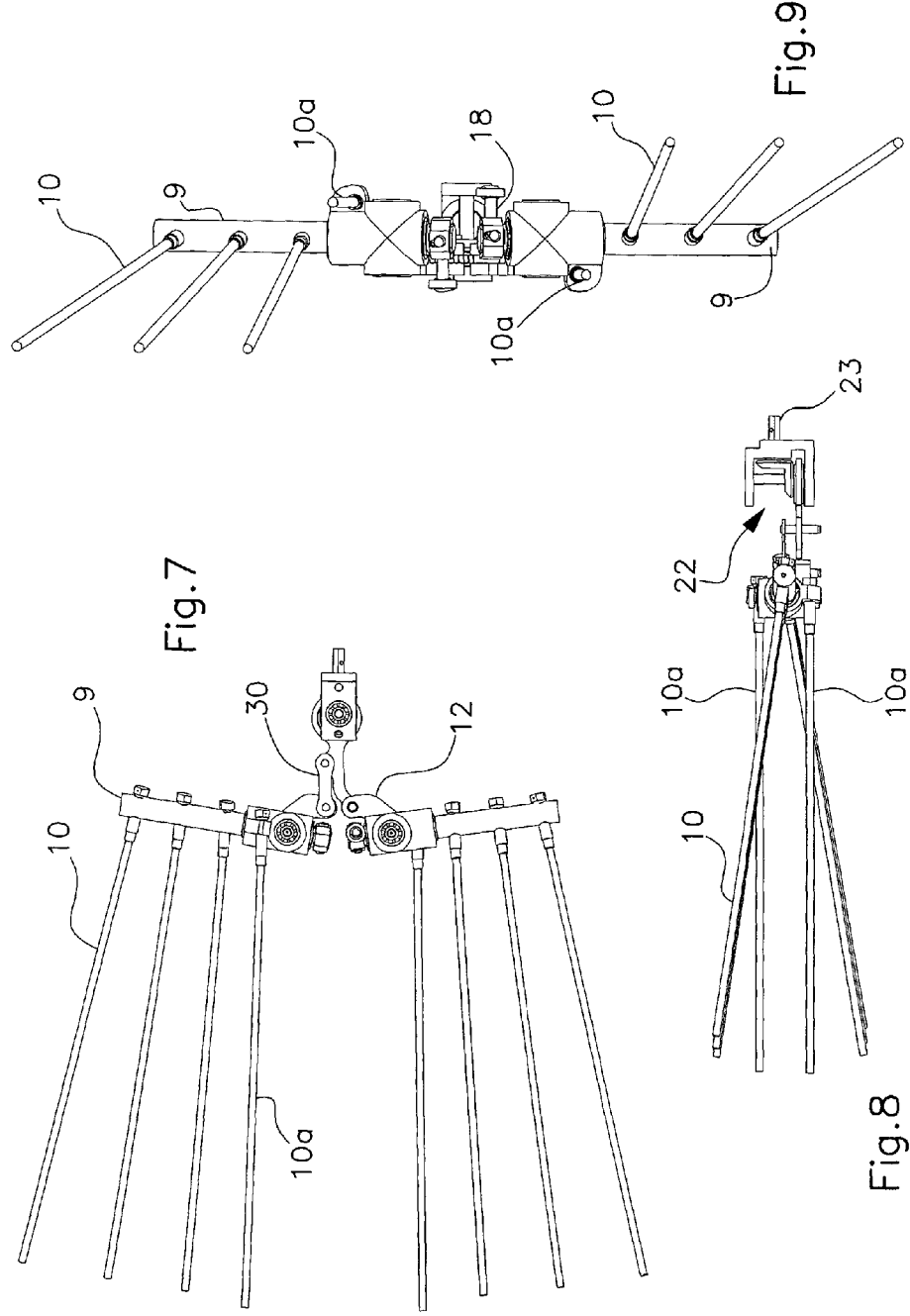

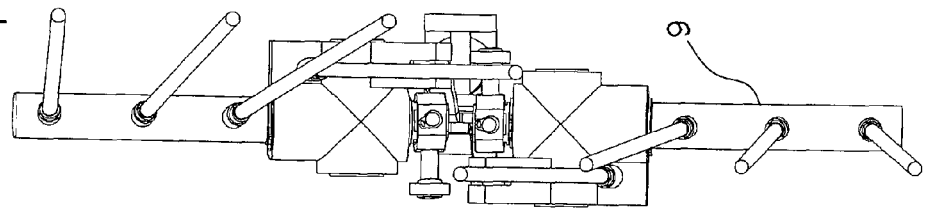
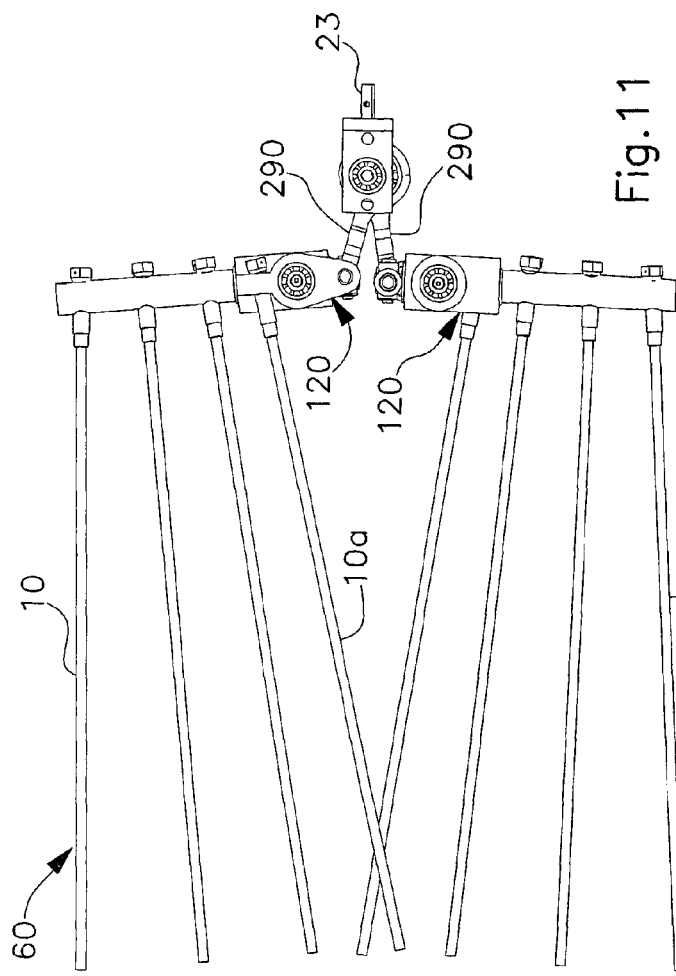
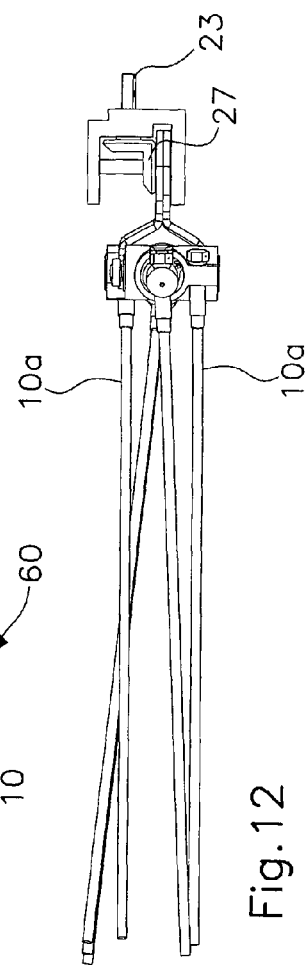

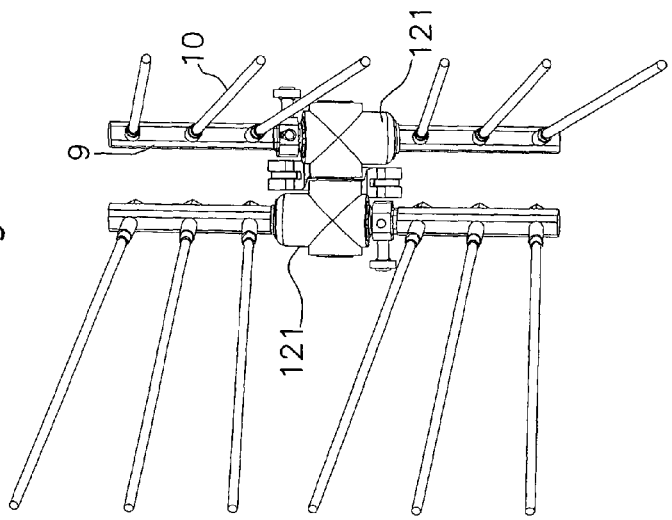
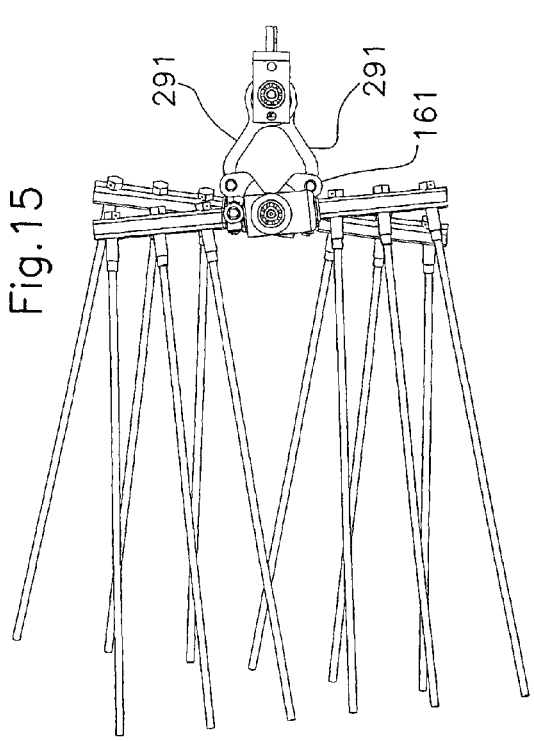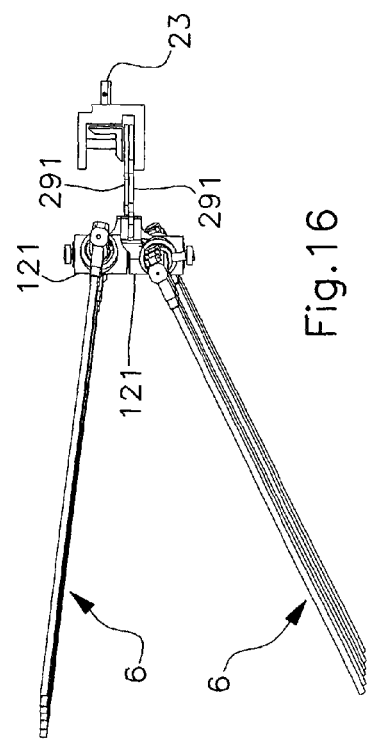

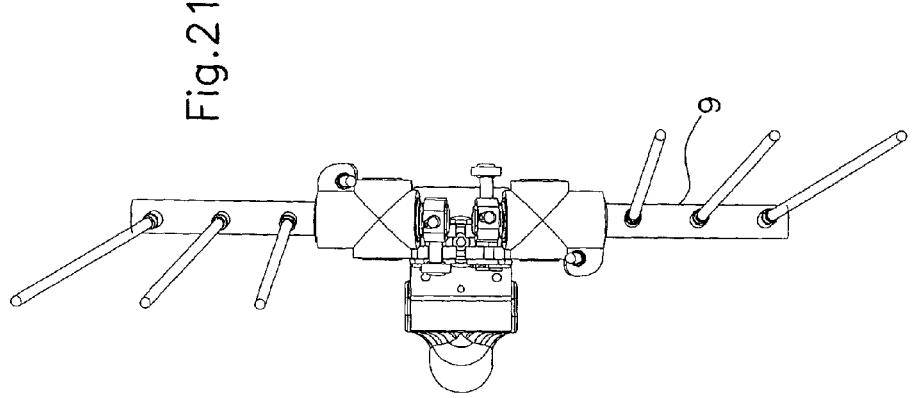
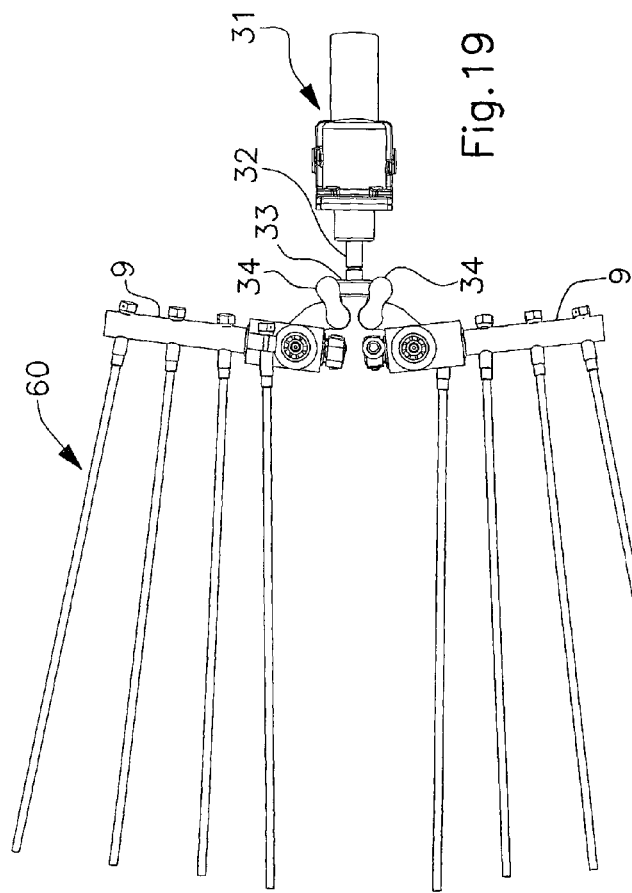
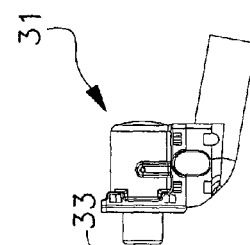

Fig.24
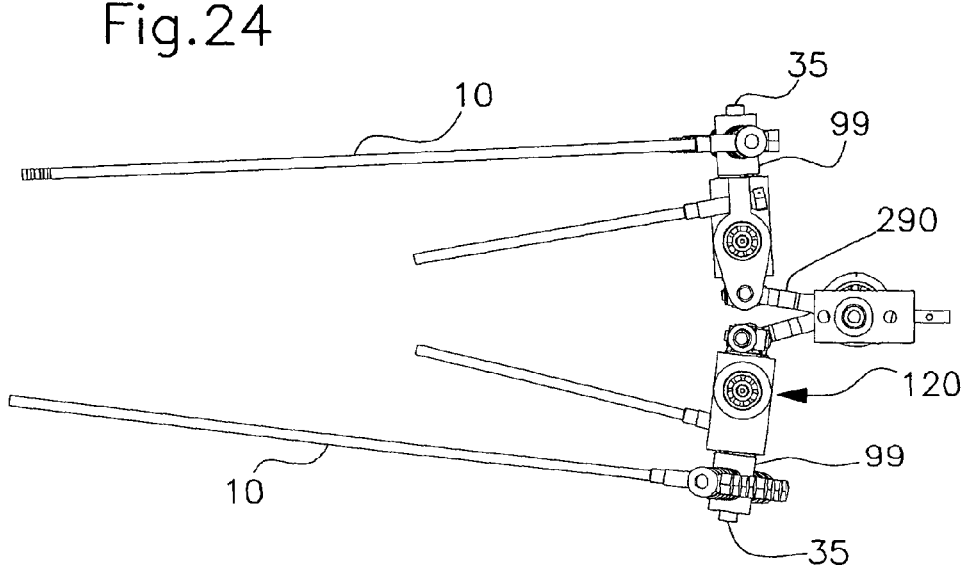
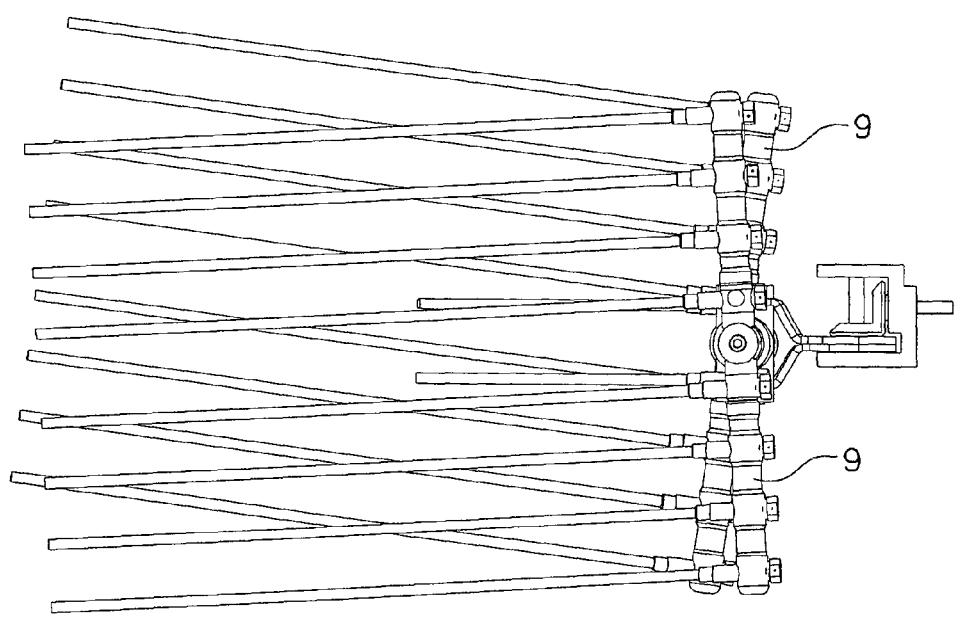
Fig.25

APPARATUS FOR PICKING OLIVES AND THE LIKE

TECHNICAL FIELD

The present invention regards an apparatus for picking olives and similar products having small dimensions.

BACKGROUND ART

It has been known that in order to perform the picking of olives and of other similar products having small dimensions picking apparatuses are used, commonly called beaters, suitable to act on the branches of fruit trees, shaking them, in order to provoke the detachment and then the falling down of the fruits.

The beaters generally provide a support rod, preferably of the telescopic type, suitable to be carried by an agricultural ma chine, or manually by an operator at a suitable end handle. At the free end the rod carries a series of shaker elements, suitably shaped for being inserted between the branches, suitable to be actuated in rotation or in a tilting motion by means of drives of the pneumatic or electric type.

In particular, nowadays are known beaters comprising long and narrow shaker elements, for example rod-like or thread-like. Such beater elements can be carried by a suitable support and then actuated in rotation, or articulated to the same support and actuated in oscillation.

A beater of the aforesaid type is illustrated for example in the European patent EP1621063 A2 relating to a device for picking olives and similar agricultural products comprising a couple of opposite oscillating sectors, provided with a plurality of rods fixed thereto in a rake configuration. The oscillating sectors are articulated to a support body of the device and are connected to means for actuating the oscillation motion. The device also comprises kinetic connection means for connecting the actuation means to an electric motor member rigidly linked to a manipulation and support rod.

Patent application EP1795064 A1 discloses an apparatus for harvesting olives comprising a couple of combs designed to engage with the fruits to be harvested, a support rod for the combs which extends from one end of a central structure, a grip portion made on the aforesaid central structure, a motor member suitable to move the combs and means for transmitting motion form the motor member to the combs.

The known beaters have made the olive picking operations quicker and easier, nevertheless they still present non negligible drawbacks.

First of all such apparatuses have considerable bulk dimensions and weight, sometimes not perfectly equilibrated. For this reason the insertion of the shaker members between the branches of the trees can result problematic and laborious for the operator.

Moreover such apparatuses do not al low to act in a uniform and efficient way on the foliage of the trees. As a consequence the risk of damaging the plants increases because of the use of such apparatuses. In fact a use which is not well controlled by the operator can lead to scratch or even to shear the branches of the trees, at the germinable part, compromising in such a way the production of fruits for the folio wing year. Such a risk turns out to be worse by the arising of undesired vibrations due to the actuation of the beating elements, if these latter are not perfectly equilibrated.

DISCLOSURE

The task of the present invention is that of solving the aforementioned problems, devising an apparatus which allows to perform in an efficient and safe way the picking of olives and the like.

Within such task, it is a further scope of the present invention that of providing an apparatus for picking olives which presents a compact structure and is easy to use for the operator.

Another scope of the present invention is that of providing an apparatus for picking olives which is easy to assemble and to maintain.

A further object of the present invention is that of providing an apparatus for picking olives having a simple conception and a reliable structure.

The cited scopes are attained, according to the present invention, by the apparatus for picking olives and the like according to claim 1.

Such scopes are attained by means of an apparatus provided with a shaker unit comprising at least one comb sector and with a drive unit suitable to transmit to the comb sector a substantially swinging motion suitable to provoke the falling down of the olives or of similar fruits when the apparatus is actuated among the branches of the tree to be treated. The apparatus according to the invention is characterized in that the comb sector presents a double constraint to the fixed containment box. More precisely the comb sector presents a support structure for a plurality of teeth, suitable to be constrained coaxial and rotating in a sleeve which is on its turn hinged to the containment box according to a transverse axis, that is an axis extending transversally with respect to the support structure. The support structure of the teeth is further con strained to the fixed box in a portion axially distanced from such a transverse axis by means of an articulated joint. The motion of the teeth carried by the cited support structure is therefore a motion resulting from the combination of two distinct swinging motions, each one being produced by a respective constraint applied to a respective portion of the support structure of the teeth.

Advantageously the apparatus can further comprise one or more additional teeth directly constrained to the swinging sleeve, that is in addition to the teeth which are integral to the support structure. Such additional teeth are suitable to swing integrally to the sleeve by effect of the motion actuated by the actuation means of the drive unit. In such a case the apparatus comprises then teeth mobile according differentiated motions: the teeth integral to the support structure are mobile according to the previously cited resulting motion, while the additional teeth fixed to the sleeve are mobile according to the only swinging motion of this latter. The interaction on the foliage of the tree therefore turns out extremely efficient, as further to increase the concentration of the teeth that interact simultaneously in one same area, it also allows to reach efficiently a bigger number of branches, wherever they are oriented. In substance the area efficiently swept by the teeth is considerably increased with respect to the known devices.

A characteristic of the invention is given by the fact that it comprises an actuation device which has a simple and versatile structure.

In fact the apparatus can comprise gear means of the conical type suitable to transmit the motion from a motor shaft coaxial to the support rod of the apparatus and a connecting rod member directly articulated to the cited swinging sleeve to which the comb sector is constrained. The articulation occurs preferably by means of a connecting rod member eccentrically articulated to the driven wheel of the gear means. Such a solution is particularly robust and efficient further than being very compact. In fact the number of required components is highly reduced, therefore allowing to reduce the realization costs further to the mounting times as well as the maintenance and cleaning times.

Furthermore the apparatus is very versatile as it can be applied to different actuation means, for example of the pneumatic type, simply providing that the cited swinging sleeve is articulated to the head of the mobile stem of a pneumatic motor member.

At last it is possible to provide, according to a particular aspect of the invention, that the teeth are applied to the cited drive unit in a way as to result facing and mobile according to an opening and closing swinging motion. More precisely, in this case the support structure comprises, further to a support crossbar on which are arranged the teeth, a connection crossbar fixed orthogonally to the main crossbar, inserted coaxial and rotatable in the sleeve and constrained to the fixed box through an articulated joint to allow a resulting swinging motion, as previously mentioned. Nevertheless, by virtue of the facing arrangement of the comb sectors, the swinging motion becomes of opening and closing of the same sectors, the width of such a swing being of an entity variable at will, by suitably dimensioning the support structure of the combs and suitably positioning the cited constraints to the containment box.

DESCRIPTION OF DRAWINGS

Details of the invention shall be more apparent from the detailed description of a preferred embodiment of apparatus for picking olives and the like and of further embodiments, illustrated for indicative purposes in the attached drawings, wherein:

FIGS. 2, 3, 4 and 5 respectively show a perspective view, a front view, a lateral view and a plant view of a portion of the same apparatus, without protection carter, according to a first embodiment;

FIGS. 6, 7, 8 and 9 respectively show a perspective view, a front view, a lateral view and a plant view of a portion of the same apparatus, without protection carter, according to a second embodiment;

FIGS. 10, 11, 12 and 13 respectively show a perspective view, a front view, a lateral view and a plant view of a portion of the same apparatus, without protection carter, according to a third embodiment;

FIGS. 14, 15, 16 and 17 respectively show a perspective view, a front view, a lateral view and a plant view of a portion of the same apparatus, without protection carter, according to a fourth embodiment;

FIGS. 18, 19, 20 and 21 respectively show a perspective view, a front view, a lateral view and a plant view of a portion of the same apparatus, without protection carter, according to a fifth embodiment;

FIGS. 24, 25 and 26 respectively show a front view, a lateral view and a plant view of the portion of apparatus illustrated in FIGS. 22 and 23.

BEST MODE

With particular reference to such figures, the apparatus for picking olives and the like according to the invention is indicated in its entirety with 1. The apparatus comprises a support body 2 at the top of which is applied a shaker unit 3. The support body comprises in a preferable but not limitative manner a tubular shaped support rod.

Figure 1:
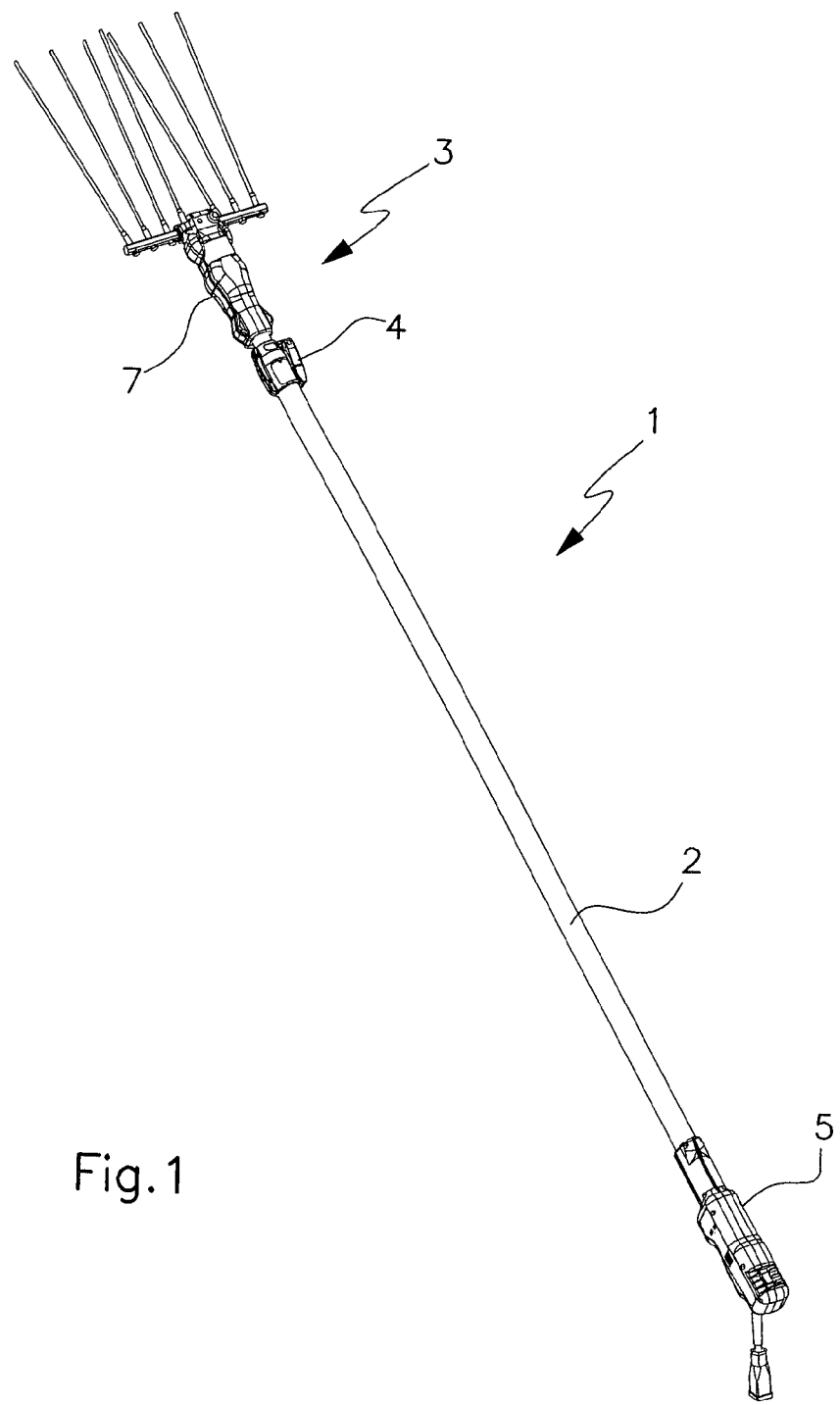
FIG. 1 shows a perspective view of an apparatus for picking olives according to the invention.
Figure 2:
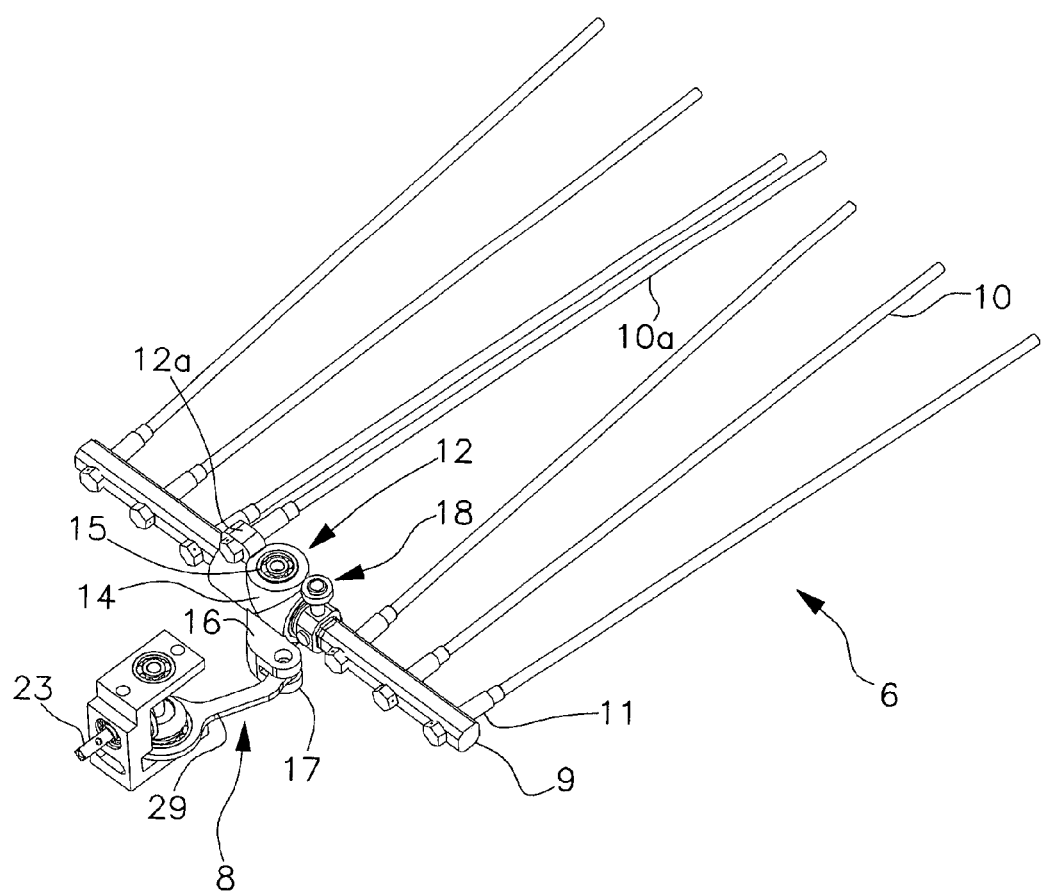

The support rod 2 is preferably of the telescopic type and is therefore provided with a suitable lever 4, distal with respect to a handle 5, for adjusting the length (see FIG. 1).

Inside a casing for example made of plastics, suitable to define the handle 5 of the rod 2, electric connection means are housed in order to enable the feed of the power supply used for actuating the shaker unit 3, for example from a generator of the battery type. The handle 5 is provided with control means of known type, suitable to control the dispense or the interruption of the supply provided by the aforesaid supply means or by alternative supply means.

Alternatively the apparatus according to the invention can be actuated by means of a motor member of the shoulder electric type or for cars or, again, of the piston type or pneumatic.

The shaker unit 3 is provided with at least one comb sector 6, with a containment box 7 or protection carter, inside which is housed a drive unit 8 for driving the same comb sector. In the first embodiment illustrated in figures from 1 to 4 is provided a unique comb sector 6 suitable to be driven by the drive unit 8. In the following further embodiments which provide a plurality of comb sectors are also described.

The comb sector 6 presents a support structure 9 for example made by means of a crossbar on which is prearranged in series, for example engaged, a plurality of teeth 10, suitably spaced. In the illustrated case, the teeth 10 have a tubular shape and extend, starting from the respective crossbar 9, in a substantially rectilinear way. In such a case the teeth 10 of the comb sector 6 share the same longitudinal extension, in particular with a radial arrangement on the crossbar 9, to make easier, in use, an insertion distributed on a correspondingly arched zone in the foliage of the tree. Obviously different embodiments of the teeth can be provided, for ex ample having an undulated, curved or conical development. Moreover the teeth 10 can be arranged on the same longitudinal plane on the respective crossbar 9, as can be seen in particular in FIG. 5, or on alternately staggered longitudinal planes, reciprocally diverging from the crossbar 9. Still, the crossbar 9 can have a tubular shape, for example with a circular section, or with a polygonal triangular or quadrangular section, with the teeth 10 fixed by means of known engagement and fixing means 11 at a median ax is or in proximity of the peripheral surface. Alternatively the teeth 10 can be made integral to the support structure 9, for example through moulding.

The support structure 9 is constrained in a double way to the containment box 7, so as to lead to a correspondingly combined motion of the teeth 10, as better illustrated in the following.

More precisely, the structure comprising the crossbar 9 is inserted rotatable in a sleeve 12 which is in its turn hinged to the containment box 7 according to a transverse axis 13, that is an axis extending transversally with respect to the support structure 9. More precisely the sleeve 12 is arranged coaxial to the crossbar 9 and comprises transversally at opposite sides a couple of tubular protrusions 14 suitable to house rolling means 15 to allow the corresponding swinging of the crossbar 9 with respect to the containment box 7. In the illustrated case the sleeve 12 is inserted in a substantially central zone of the crossbar 9, with portions of the crossbar 9 having substantially equal extensions, which protrude from both sides of the crossbar 9. In such a case the teeth 10 are distributed on the crossbar 9 in a uniform way from either part with respect to the pivot for hinging to the containment box 7. Alternatively different arrangements of the sleeve 12 with respect to the crossbar 9 are possible, as better exemplified in the following. If the teeth 10 are obtained through moulding directly on the support crossbar 9, the sleeve 12 is usefully realized in more parts which can be assembled, for example through half-covers closed at the upper part by a lid, in a way as to enable to fix the teeth 10 with the desired orientation about the longitudinal axis of the same crossbar 9.

The sleeve 12 further shapes an articulation portion 16 which in the illustrated case is oriented towards the drive unit 8. The articulation portion 16 preferably shapes a fork end 17 suitable to be articulated through the aid of a transverse pin to correspondent means for transmitting the motion present in the drive unit 8.

It is important to note that the sleeve 12 can advantageously comprise a support appendix 12a for an additional series of teeth 10a, substantially in addition to the teeth 10 directly carried by the crossbar 9. Such an additional series of teeth 10a is therefore made integral exclusively to the motion of the sleeve 12, while instead it is independent from the motion of the crossbar 9, as better illustrated in the following.

In the case illustrated in figures from 2 to 5 is provided one only tooth 10a engaged or in any way fixed on the sleeve 12, but further arrangements are also possible, for example with a plurality of additional teeth 10a arranged in series on a suitable support bracket shaped by the sleeve 12. Such a support bracket can be oriented on a plane parallel to the crossbar 9 or on an oblique plane, in particular perpendicular thereto, in any case in such a way as not to interfere with the differentiated motion of the teeth 10 carried directly by the crossbar 9.

The crossbar 9 and the teeth 10 directly carried thereby are provided with a second swinging motion, additional with respect to the one of the cited swinging about the transverse axis 13. Such an additional motion results from the fact that the crossbar 9 is constrained to the containment box 7 at the side of the transverse axis 13 by means of an articulated joint 18. More precisely the articulated joint 18 comprises an arm shaping at one end a fixing portion 19 for fixing to the crossbar 9, for example through a transverse fixing pin, and at the other end an articulated rod end 20 suitable to be articulated to the containment box 7 through the interposition of a suitable spherical housing seat 21. As an example the fixing portion 19 can have the shape of a ring inserted on the crossbar 9 in a portion distal to the sleeve 12, or, in alternative a fork element integral to the arm of the articulated joint 18 or realized as a separated component and then fixed to the arm. In any case the fixing portion 19 makes the constraint of an end of the articulated joint 18 to a section of the support structure 9 of the teeth 10 distal with respect to the transverse pin 13 for hinging the sleeve 12 to the containment box 7.

In substance the crossbar is constrained to the containment box 7 by means of a first constraint represented by the hinge according to the transverse axis 13 to the sleeve 12 and by means of a second constraint realized by the articulated joint 18. The first constraint enables the swinging of the crossbar 9 about the axis 13, while the second constraint realizes a swinging about the longitudinal axis of the same crossbar 9, this latter swinging being enabled by the rotatable insertion of the crossbar 9 in the sleeve 12.

In a corresponding manner the teeth 10 integral to the crossbar 9 are suitable to swing according to a comb fined motion resulting from two swinging motions, the one of the crossbar 9 with respect to the sleeve 12 and the one of the sleeve 12. Instead the teeth 10a integral to the only sleeve 12 are suitable to follow only the corresponding swinging motion, therefore swinging on the plane orthogonal to the transverse axis 13. The motions of the teeth 10 and of the teeth 10a are therefore distinct. More precisely at the difference of the additional teeth 10a, the teeth 10 are swinging out of the plane orthogonal to the transverse axis 13 by effect of the further swinging motion about the axis of the crossbar 9 generated by effect of the articulated joint 18.

The provision of a support appendix 12a or of a support arm associated with the sleeve 12 is very advantageous as it enables the apparatus 1 to act in a differentiated manner on the foliage of the tree, that is through the differentiated alternated motions of the teeth 10 and 10a respectively. In the meantime the provision of the additional teeth 10a independent from the motion of the teeth 10 and physically distinct therefrom allows to considerably increase the volume actually swept by the apparatus 1 inside the foliage of the tree.

The drive unit 8 comprises an actuation device 22 suitable to apply to the articulation portion 16 an alternating motion able to cause the cited swinging motion of the sleeve 12 about the transverse axis 13.

In the case illustrated in figures from 1 to 5, the actuation device 22 comprises a motor shaft 23 inserted coaxial in the support body 2 and actuated in rotation by a motor member suitably housed inside the handle 5 or at the top of the support body or at the respective support rod 2, if provided. The actuation device 22 also comprises gear means 24 and a box support structure 25 suitable to contain the aforesaid gear means 24.

The box support structure 25 is for ex ample made as a fork and comprises lateral walls which extend in a substantially orthogonal way from a common support base, at which the motor shaft 23 is inserted through by the interposition of rolling support means of the known type.

The gear means 24 are preferably of the conical type and comprise a driving wheel 26 constrained in a known way to the motor shaft 23 to receive the motion therefrom, and a driven wheel 27 rotatable according to the axis of a support pin 28 oblique or transverse, for example perpendicular, with respect to the axis of the motor shaft 23. In particular, the support pin 28 is advantageously supported at the ends on both the lateral walls of the box support structure 25, to warrant the maxi mum stability of the unit and reduce the arising of vibrations at the minimum. The support pin 28 is therefore supported efficiently by the box structure 25 through the interposition of suitable rolling support means of the ball bearing type or of equivalent means.

At last the actuation device 22 comprises a connecting rod member 29 articulated eccentrically with respect to the driven wheel 27 and further, at the opposite end, to the articulation portion 16 at the fork end 17. For example the connecting rod member 29, as in the illustrated case, can provide a first ring shaped portion inserted rotatably about a disk articulated eccentrically to the driven wheel 27, an angled extension intermediate arm and an opposite end for articulating to the sleeve 12. The angled extension of the above said intermediate arm serves in particular to contrast the stresses of wear due to the cyclic flexure acting on the member in swinging movement, reinforcing the majorly stressed sections. Nevertheless it is possible to provide that the connecting rod member 29 is shaped in a different way.

In a second embodiment illustrated in figures from 6 to 9, the apparatus for picking olives comprises a couple of comb sectors 60 or semi-sectors. In the illustrated case each comb sector 60 is articulated to the containment box 7, not represented for simplicity, by means of a respective sleeve 12 totally structurally and functionally similar to the sleeve previously described. In particular each crossbar 9 is inserted rotatably inside the respective sleeve 12 at an end portion, exiting from opposite parts with respect to a central zone wherein the sleeves 12 are hinged in distal position on the containment box 7. The sleeves 12 of the illustrated embodiment respectively shape, at opposite parts with respect to a median longitudinal plane, the connection portion whereon an additional tooth 10a is engaged. Also in such a case a plurality of additional teeth 10a can be provided.

It is to be noted that according to such an embodiment the connecting rod member 29 for transmitting the motion is articulated to one of the comb sectors 60 in the previously described mode. The connecting rod member 29 is instead articulated to the other comb sector 60 through the interposition of a link-shaped binary element 30. For example the link 30 is articulated to the connecting rod member 29 at a position median to the intermediate arm.

In a way totally similar to what is previously described the comb sectors 60 are provided with a combined swinging motion. In fact, as previously described, the crossbar 9 of each sector is constrained further to the sleeve 12 also to the articulated joint 18, so swinging both about its own longitudinal axis and about the transverse axis 13 of the respective hinge sleeve 12. Such a solution turns out particularly compact and light by virtue of the reduced number of components dedicated to the drive of the comb shaker means 3.

In a third embodiment of the apparatus 1 illustrated in figures from 10 to 13 is equally present a couple of comb semi-sectors 60 with the crossbars side by side on the same swinging plane.

Unlike the previous embodiment, the sleeves 120 shape an articulation portion 160 protruding frontally from the tubular protrusions for hinging to the containment box 7. In such a way the sleeves 120 are articulated to the actuation device 22 in an opposed way according to a median font plane, that is at the front and at the rear part of the plane of the crossbars 9. Advantageously the actuation device 22 has a couple of connecting rod members 290, each one being articulated to a disk eccentric to the driven wheel 27 and to the corresponding sleeve 120. In particular, the connecting rod members 290 have respective intermediate arms respectively diverging on respective planes opposed with respect to the plane of the comb sectors 60. Such a solution, which is functionally similar to the already described embodiments for the remaining technical features, allows to divide the dynamic action for each connecting rod member 290, with consequent reduction of the transverse sections, under the same acting stress. So such a solution results very resistant from the structural point of view, so particularly adapted in the case of particularly high resistant actions.

In a fourth embodiment illustrated in figures from 14 to 17, is pro vided a couple of comb sectors 6 with the respective crossbars 9 arranged on parallel planes and pivoted at a central zone of the containment box 7 by means of respective sleeves 121.

In this case the comb sectors are arranged in a way totally similar to the comb sector described and illustrated in figures from 1 to 5, with the teeth 10 carried by the crossbar 9 preferably uniformly distributed on each side of the sleeves 121.

In such a case, the sleeves 121 shape the articulation portion 161 in a zone underneath the longitudinal axis of the same sleeve 121, interposed between the swinging planes of the crossbars 9. In this case the connecting rod members 291 have a flat conformation, as in the first embodiment and can be approached to each other (see FIG. 16). As previously the angulated conformation of the intermediate arm of each connecting rod member 291 turns out to be advantageous. It is important to note that the facing comb sectors 6 are preferably oriented in a configuration with the teeth 10 reciprocally diverging, so as to avoid any possible interference and in the meantime increase the space of action of the same combs.

In a fifth embodiment illustrated in figures from 18 to 21 the actuation device 22 comprises a motor member 31 of the pneumatic type. The motor member 31 comprises a stem 32 carrying a head 33 suitable to be articulated to the couple of comb sectors 60 arranged in a way totally similar to the sectors of the second described embodiment. In particular for each comb sector 60 the respective articulation portion 16 of the sleeves 12 is articulated to the aforesaid head 33 through a link shaped binary member 34, therefore determining the transformation of the alternated translation motion of the stem 32 in a swinging motion of each comb sector 60 about the respective transverse axis 13. Such a solution is particularly versatile, further than compact and effective in the transmission of the motion.

At last according to a sixth embodiment illustrated in figures from 22 to 26 the support structure 9 of the teeth comprises a main crossbar, carrying directly the teeth 10 in a way totally similar to the crossbar described so far, and an auxiliary support crossbar 99. More precisely the auxiliary crossbar 99 is fixed at one end to the main crossbar 9, for example at a central portion thereof, in such a way that the support structure 9 has a substantially T-shape. To such an end the auxiliary crossbar 99 can comprise a suitable end joint for the transverse insertion of the main crossbar 9. The auxiliary 99 is further suitable to be on its turn constrained axially rotatable to the sleeve 120, in a way totally similar to what is previously described. In fact the auxiliary crossbar 99 is constrained through an articulated joint 18 to the containment box 7, so as to realize the combination of swinging motions already disclosed for the previously described embodiments.

Figure 10:
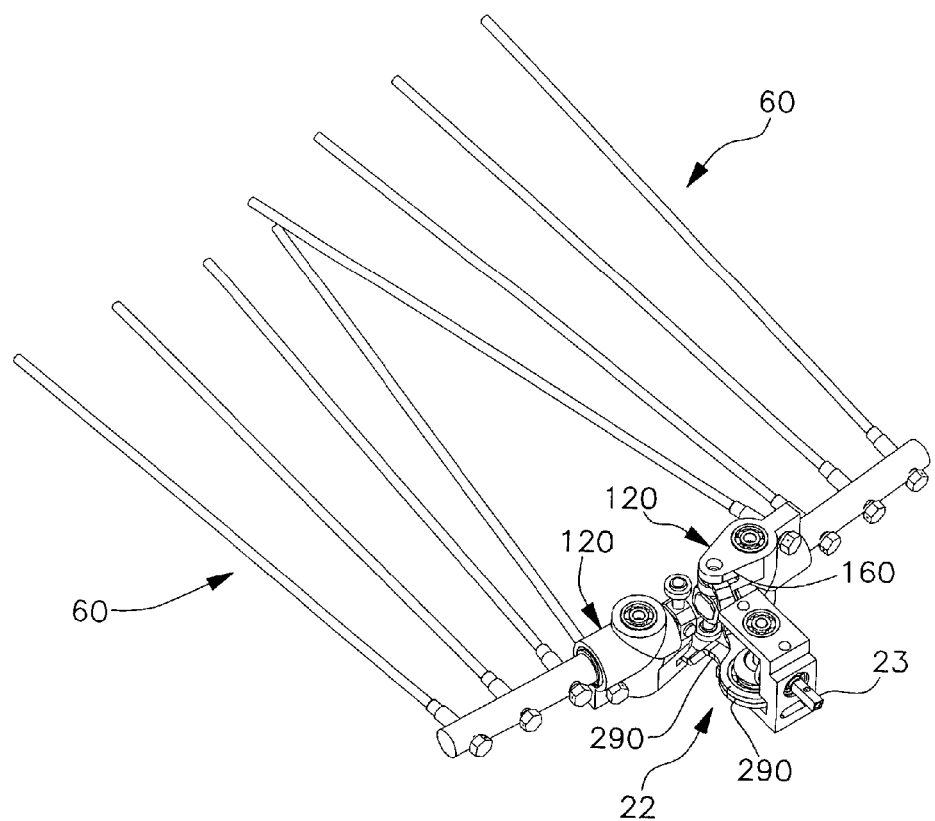
Figure 14:
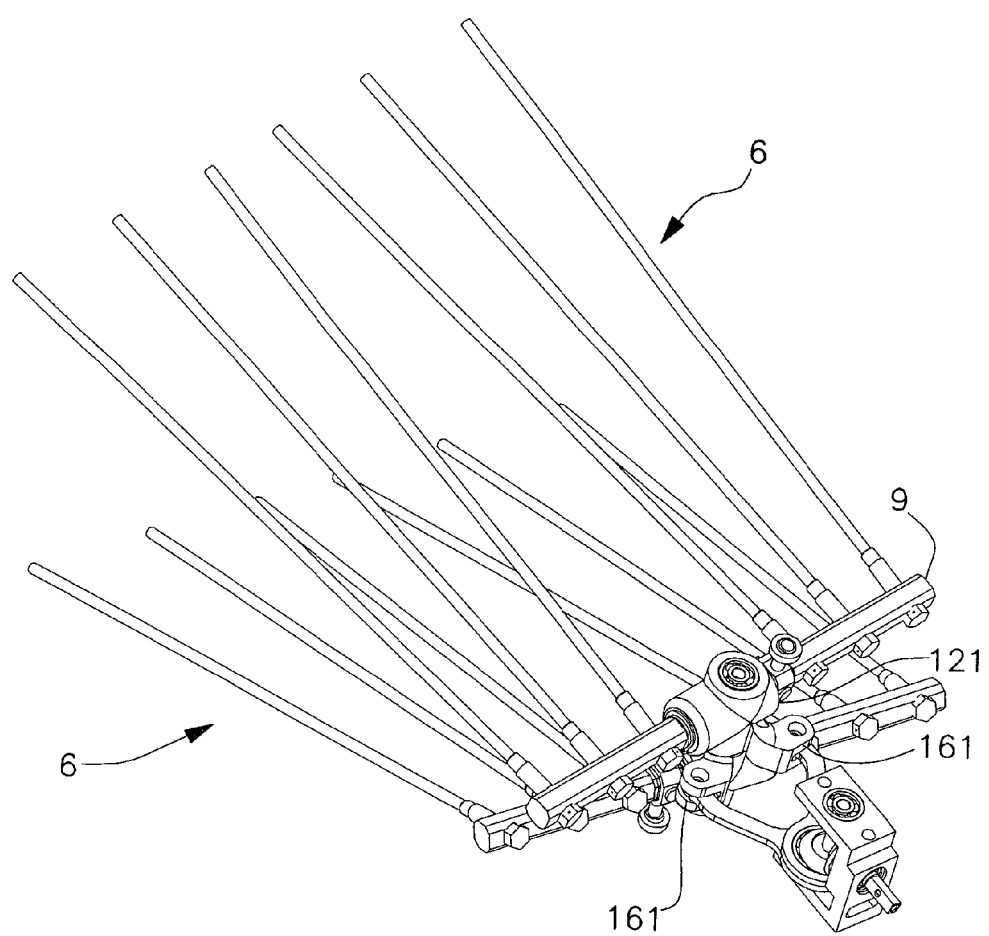
Figure 18:
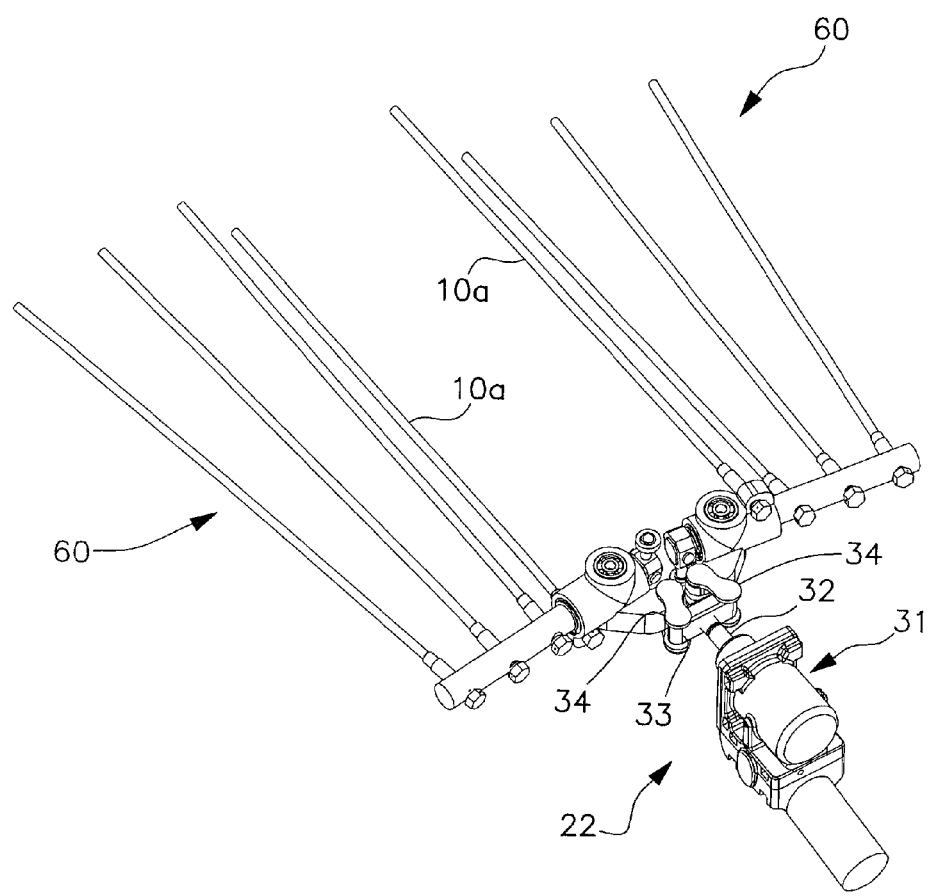
Figure 22:
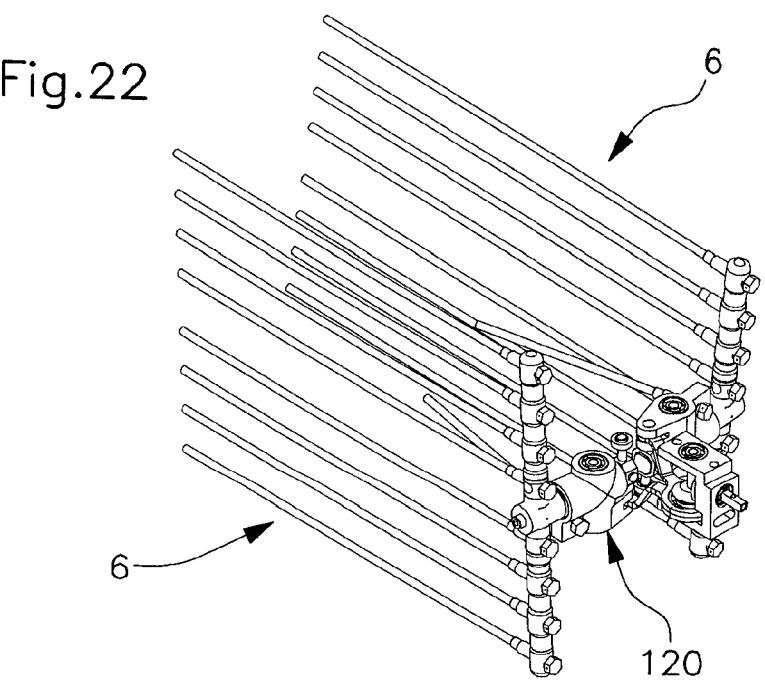
FIGS. 22 and 23 show perspective views of a portion of the apparatus, still without protection carter, according to a sixth embodiment.
Figure 23:
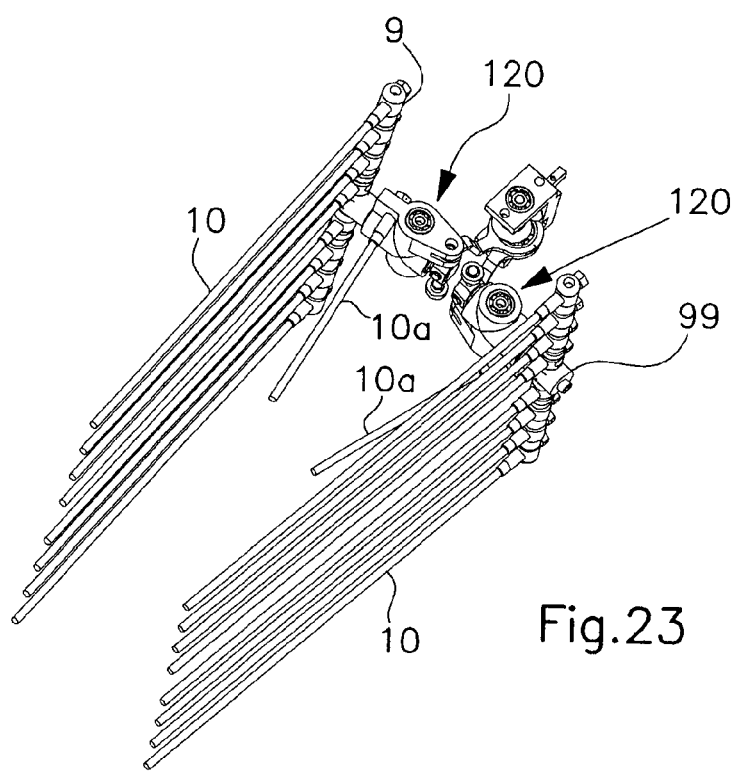
Figure 26:
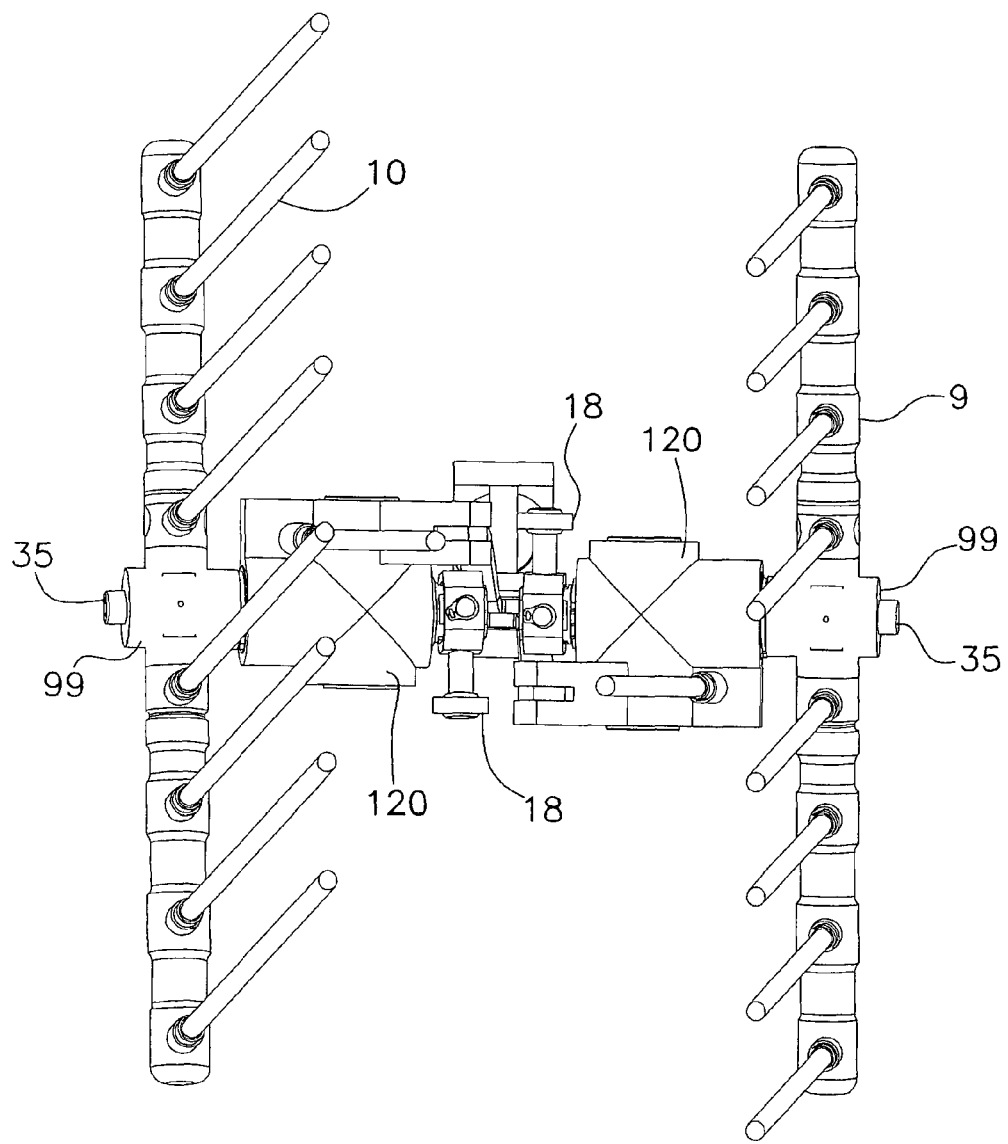

In the illustrated solution each comb sector 6 is actuated through a respective connecting rod member 290, in a way totally similar to the third described embodiment (see in particular FIG. 10). Alternatively different actuations, preferably of the type of the ones described for the other illustrated embodiments, can be provided for the same technical solution comprising auxiliary crossbars 99 transversely carrying the main crossbars 9 for supporting the teeth 10.

Usefully the rigid connection between the main crossbar 9 and the auxiliary crossbar 99 is realized through removable connecting means 35 in order to allow for the maximum adjustment capability as to the positioning of the teeth 10.

In particular it has to be noticed that the provision of the auxiliary crossbar 99 allows to arrange the comb sectors 6 facing instead of in a side by side configuration and especially, thanks to the double constraint of the support structure to the containment box 7, to translate the resulting combined motion in an alternating motion of opening and closing of the comb sectors 6.

Again, it is to be highlighted that such a solution is particularly versatile as it is able to perform the picking of any product, independently from the shape and dimensions of the plant. In fact it suffices fitting the extension of the auxiliary crossbar 99 and so the centre distance between both opposite crossbars 9 to increase or decrease at will the volume comprised between the two sectors 6, thus adapting to the needs of the actual case. As a consequence, plants with more or less bulky branches and with more or less voluminous fruits can be equally treated with the same apparatus, simply intervening on the extension of the auxiliary crossbar 99 and/or on the inclination of the teeth 10 with respect thereto, acting on the fixing means 35 of the main crossbar 9. The remaining technical features of such an embodiment are totally similar both in the structure and in the functioning to the ones previously described, in particular the provision of additional teeth 10a integral to the sleeve 120 or of one comb sector only instead of a couple of sectors 6, 60.

The functioning of the apparatus for picking olives is described in the following.

In a first step, wherein the motor member is inactive, the operator adjusts the longitudinal extension of the support rod 2 by blocking it at the desired extension by means of the lever 4. Then he grasps the support rod 2 at the handle 5 and lifts it, positioning it in a substantially vertical way in proximity of the tree wherein the picking of the olives is needed.

The rod 2 is then manipulated so as to insert progressively the unique comb sector 6 or the comb sectors 60, according to the case, inside the foliage of the tree.

The motor member is actuated acting on the control means present on the handle 5, provoking the activation of the swinging motion of the teeth 10, 10a on the cross bar 9 and/or on the sleeve 12, 120, 121, shaking the branches engaged thereby, thus causing the detachment of the olives which are then picked on the ground. In particular the teeth 10 are actuated in a double swinging motion: a first swinging motion about the transverse axis 13 of the sleeves 12, 120, 121 and a second swinging motion about the longitudinal axis of the swinging sleeve. The combination of such motions drives the teeth 10 in a motion resulting three-dimensional, which goes out of the swinging plane of the sleeves 12, 120, 121 about the axis 13. On the contrary the teeth 10a directly engaged on the swinging sleeves are only provided with the swinging motion of these latter and so concur to produce on the whole a differentiated motion on the foliage of the tree.

By suitably displacing the shaker means or combs between the foliage of the tree it is possible to complete the picking of the olives.

At the end of the picking operations the drive means of the comb sectors 6, 60 are deactivated to put the tool away or to perform the picking on further plants.

The apparatus for picking olives and the like therefore allows to attain the scope of carrying out in an effective and safe manner the picking of the olives and the like.

In practice, the embodiment of the invention, the materials used, as well as the shape and dimensions, may vary depending on the requirements.

Should the technical characteristics mentioned in each claim be followed by reference signs, such reference signs were included strictly with the aim of enhancing the understanding the claims and hence they shall not be deemed restrictive in any manner whatsoever on the scope of each element identified for exemplifying purposes by such reference signs.

The invention claimed is:

1. An apparatus for harvesting olives and similar products, the apparatus comprising:
   a support body suitable to be grasped;
   a shaker unit comprising a containment box suitable to be mounted at the top of said support body;
   at least one comb sector comprising a support structure constrained integral to a plurality of teeth, and carried mobile by said containment box;
   a motor member for actuating said comb sector in a substantially swinging motion, said support structure of said comb sector being constrained coaxial and rotatably to a sleeve hinged to said containment box at a transverse axis extending transversally with respect to said support structure, so as to produce a first swinging motion of said support structure about said transverse axis upon actuation of said motor member, and said support structure being further constrained to said containment box at a portion axially distal to a portion connected to said sleeve by an articulated joint, in such a way as to be able to swing according to a second swinging motion of said support structure about a longitudinal axis of said support structure.

2. An apparatus according to claim 1, wherein said articulated joint comprises an arm shaping, at an end, a portion for fixing to said support structure and at an opposite end an articulated rod end suitable to be articulated to said containment box through an interposition of a spherical housing seat.

3. An apparatus according to claim 2, wherein said sleeve shapes a support appendix integral thereto and at least one additional tooth engaged on said appendix, in such a way that said at least one additional tooth is mobile according to said first swinging motion.

4. An apparatus according to claim 3, wherein said support appendix shapes a support arm for a plurality of additional teeth, arranged parallel to a longitudinal axis of said sleeve or in an oblique way with respect thereto.

5. An apparatus according to claim 2, further comprising:
   a motor shaft axially connected to said support body;
   a gear comprising a driving wheel keyed to said motor shaft and a driven wheel rotatable about an axis of a second support pin transverse to an axis of said motor shaft;
   a connecting rod member eccentrically articulated with respect to said driven wheel and further, at an opposite end, to an articulation portion carried by said sleeve.

6. An apparatus according to claim 5, further comprising:
   another comb sector to provide a couple of comb sectors, each of said comb sectors comprising one said support structure shaping a crossbar inserted in a respective said sleeve at one end and being one said sleeve articulated to said connecting rod member and another one said sleeve articulated to a binary member or link articulated at a turn of said another sleeve to said connecting rod member, to produce said first swinging motion and said second swinging motion of said crossbars.

7. An apparatus according to claim 5, further comprising:
   another comb sector to provide a couple of comb sectors, each of said comb sectors comprising one said support structure shaping a crossbar inserted in a respective said sleeve at one end and each said sleeve being articulated at an articulation portion to one respective said connecting rod member eccentrically articulated to said driven wheel, to produce said first swinging motion and said second swinging motion of said crossbars.

8. An apparatus according to claim 5, further comprising:
another comb sector to provide a couple of comb sectors, each of said comb sectors comprising said support structure shaping a crossbar inserted in one respective said sleeve in a substantially central position of said crossbar, said crossbars being arranged facing and each said sleeve being articulated at an articulation portion to one respective said connecting rod member eccentrically articulated to said driven wheel, to produce said first swinging motion and said second swinging motion of said crossbars.

9. An apparatus according to claim 2, further comprising:
a motor unit of a pneumatic type carrying a stem which is movable according to an alternated translational motion actuated by said motor unit, said motor unit being provided with a head articulated by a binary member to a respective articulation portion shaped by said sleeve to produce said first swinging motion and said second swinging motion of at least one crossbar.

10. An apparatus according to claim 2, wherein said support structure comprises a main crossbar carrying said teeth and an auxiliary crossbar constrained transversally to said main crossbar, said auxiliary crossbar being inserted axially rotating in said sleeve and being constrained to said containment box by said articulated joint to determine said motion resulting from said support structure upon actuation of said motor unit.

* * * * *